United States Patent [19]
Boyd et al.

[11] 3,807,358
[45] Apr. 30, 1974

[54] ROTARY COWSHED PLATFORM DRIVE MECHANISM

[76] Inventors: Colin David Boyd, Mangaotea Rd., R.D. 10; Gerald Ambrose Long; Stanley Francis Long, both of Tariki Rd., R.D. 10, all of Inglewood; Gordon Wickham, Granville Rd., Stratford, all of New Zealand

[22] Filed: Nov. 20, 1972

[21] Appl. No.: 307,855

[30] Foreign Application Priority Data
Nov. 19, 1971 New Zealand.................... 165,536

[52] U.S. Cl. ........................................... 119/14.04
[51] Int. Cl. .............................................. A01k 1/00
[58] Field of Search .......... 119/14.04; 91/218, 249, 91/250

[56] References Cited
UNITED STATES PATENTS
| | | | |
|---|---|---|---|
| 3,103,912 | 9/1963 | Benedetto......................... | 119/14.04 |
| 1,990,052 | 2/1935 | Sosa.................................. | 91/449 X |
| 117,808 | 8/1871 | Pangburn............................. | 91/218 |
| 134,719 | 1/1873 | West et al............................ | 91/218 |

Primary Examiner—Hugh R. Chamblee
Attorney, Agent, or Firm—Young & Thompson

[57] ABSTRACT

A rotary cowshed comprising a platform mounted for rotation about a vertical axis and having drive means comprising a double-acting fluid-operated ram mounted beneath the platform the free or outer end of the ram being adapted to engage successively with one of a series of abutments on the platform, relief valve means and by-pass control means being incorporated in the fluid control lines to the ram.

10 Claims, 6 Drawing Figures

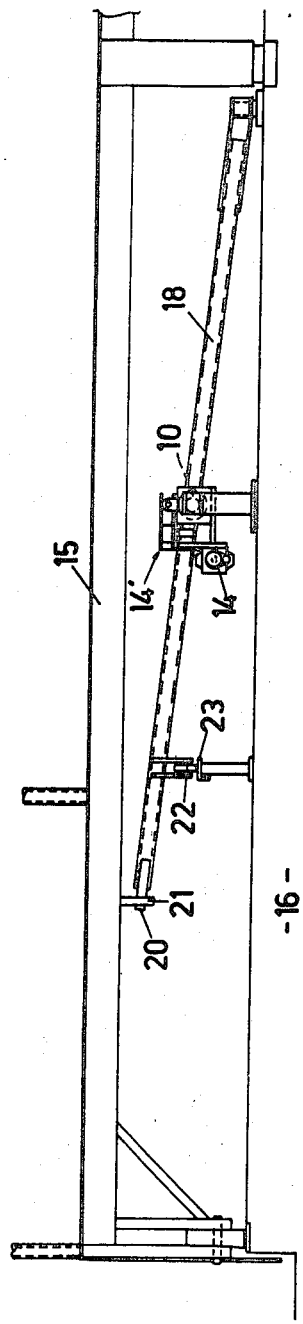

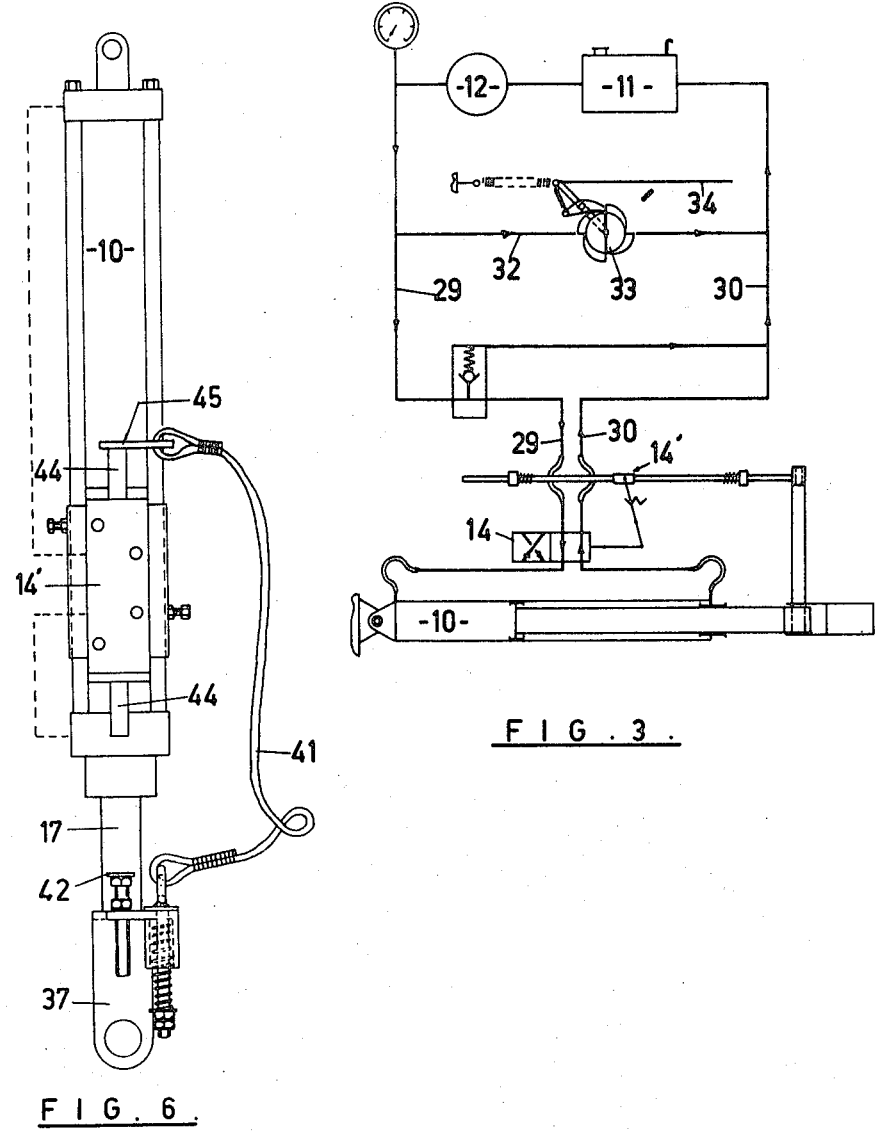

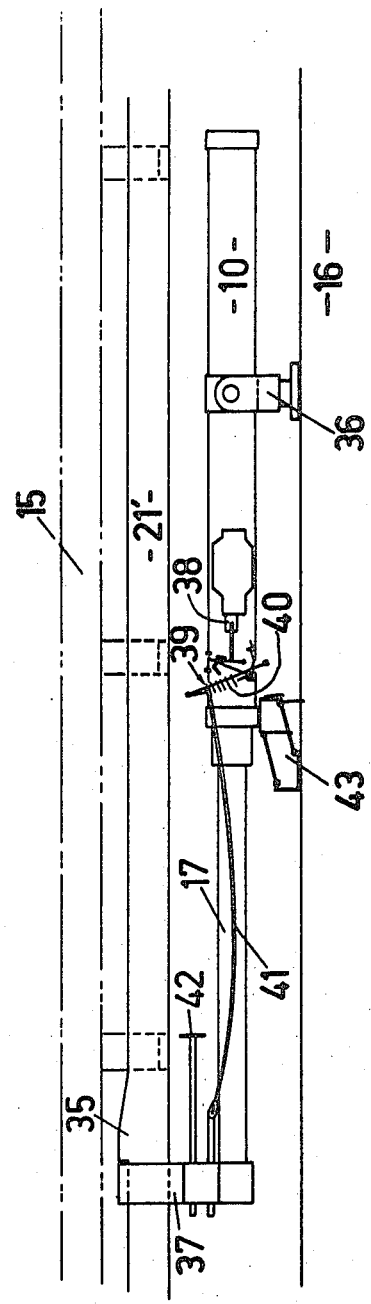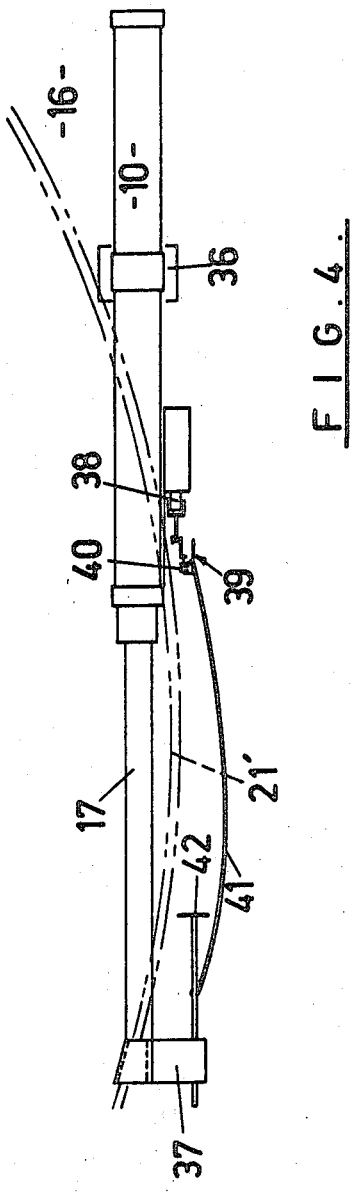

ROTARY COWSHED PLATFORM DRIVE MECHANISM

This invention relates to a rotary cowshed having a rotatable platform and drive mechanism for the platform, more particularly a rotary cowshed which rotates intermittently.

Rotary cowsheds operating on the stop-start rotation principle have mainly employed mechanical means as the prime motive means. While such drive mechanisms have been in the main successful they do have a number of drawbacks. One such drawback is the provision of a safety cutout means to cease rotation of the platform should an animal get caught between moving and stationary components of the shed. Such means have necessitated the addition of electrical cutout devices activated by mechanical means or an overriding clutch layout. These means have not been entirely successful as an animal is liable to be injured before the safety means is activated due to its mechanical nature.

A further drawback has been the difficulty in providing a control by which the rotation of the platform can be ceased by an operator from any position around the periphery of the milking table.

Broadly the invention consists of a rotary cowshed having a rotatable platform and drive means therefor comprising a double-acting fluid-operated ram mounted beneath the platform the free or outer end of the ram being adapted to engage successively with one of a series of abutments on the platform, relief valve means and by-pass control means being incorporated in the fluid control lines to the said ram.

In the following description of the invention reference will be made to the accompanying drawings in which:

FIG. 2 is an elevational view of the arrangement in FIG. 1,

FIG. 3 is a circuit diagram of the hydraulic lines and components used in controlling the ram in all embodiments of the invention, FIG. 4 is a plan view of a second form of the invention, FIG. 5 is an elevational view of the arrangement in FIG. 4, and FIG. 6 is a plan view of a modified form of the control valve and associated switching gear in position on the ram.

Figure 1:
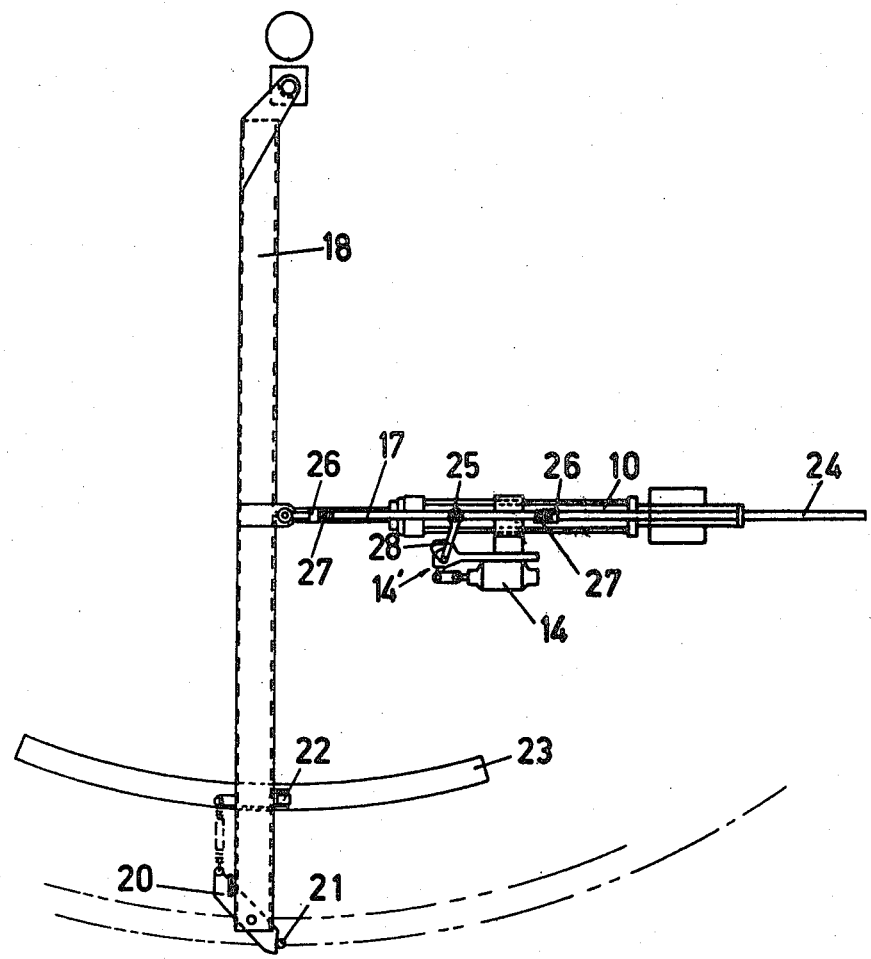
FIG. 1 is a plan view of a first form of the invention.

In more fully describing the invention the working fluid for the ram 10 may be either hydraulic or pneumatic but preferably the ram is hydraulically operated. The ram 10 is of a double-acting type being operated with oil from a reservoir 11 delivered by a motor driven pump 12. The oil passes from the pump 12 through a reversing control valve 14 before reaching the ram 10. To assist in keeping the area beneath or adjacent the milking platform 15 clear the pump 12 and reservoir 11 are external to the said milking platform 15. A spring-loaded switching mechanism 14' (more fully described later on) attached to the ram spear reverses the direction of flow of the oil as the spear nears either end of its travel by actuating the reversing control 14.

In one embodiment (FIGS. 1 and 2) the fixed end of the ram 10 is attached to the floor 16 of the shed by a suitable bracket 17 while the outer end of the spear 17 is pivotally attached to an arm 18 which serves to drive the platform 15. This arm 18 is pivotally mounted at or near the centre 19 of the milking platform 15 to the floor 16 and extends radially outwardly therefrom. The free end of the arm 18 terminates in a spring-loaded pawl 20 near the under surface of the platform 15. The arm 18 slopes upwardly from it's fixed end on the floor 16. The spring-loaded pawl 20 is adapted to engage with one of a series of pins 21 which protrude from the underside of the platform 15. These pins 21 are positioned at suitable equidistant spacings around the underside of the platform 15 to coincide with the number of stops required in one rotation. To support the arm 18 a downwardly projecting wheel or roller 22 is mounted near the pawl end, and engages on a short length of rail 23 attached to the floor 16 of the shed. This rail 23 supports the arm 18 during its back and forth movements when operating.

The outer end of the ram spear 17 is pivotally attached to the arm 18 substantially mid-way in the length of the said arm. Mounted adjacent the arm 10 is the reversing control 14 and associated spring-loaded switching mechanism 14' previously mentioned. The switching mechanism 14' consists of a sliding shaft 24, located parallel to the ram 10, and connected to the outer end of the ram spear 17 by a suitable linkage.

Situated approximately mid-way in the length of this sliding shaft 24 is a collar 25 which is held in sliding engagement with the said shaft 24. On either side of this sliding collar 25 is a fixed collar 26 set at a distance therefrom. These two fixed collars 26 are provided with means whereby their respective distance from the sliding collar 25 can be adjusted. Two springs 27 are located on the sliding shaft 24 and ride against the adjustable collars 26, the said springs 27 operating the reversing control 14 by alternately pressing against the sliding collar 25 as the sliding shaft 24 moves back and forth.

The sliding collar 25 is the prime activator for the reversing control 14' and is linked to the said control by a pivoted link member 28, said link member 28 being in working engagement with a detent.

The hydraulic lines, see FIG. 3, consist of a main supply line 29 and a main return line 30, both passing through the reversing control 14. A relief valve 31 is incorporated in the main supply line 29 before the reversing control 14 and connects directly to the return line 30. Also passing directly between the main supply line 29 and the return line 30 is a secondary line 32 in which is located a by-pass valve 33. Both valves 31 and 32 when operated separately divert the working fluid away from the ram 10 and reversing control 41.

The by-pass valve control 33 is operated by means of a pull-cord 34 shown diagramatically in FIG. 3 which can encircle either the inner or outer periphery of the platform 15 depending on the type of platform set-up. This by-pass valve 33 can be of a rotary type hydraulic valve suitably modified to operate one quarter turn at each pull of the cord 34. The control valve 33 thus provides the operators with a very quick and efficient means for controlling the rotation of the platform 15.

In operation, oil from the reservoir 11 is pumped via the supply line 29 through the reversing control 14 to one end of the double-acting ram 10. Oil is exhausted from the other end of the ram 10 back to the reservoir 11. Oil entering the ram 10 forces the ram spear 17 out towards the end of its stroke so that the pivoted arm 18 moves back until the spring-loaded pawl 20 engages one of the pins 21 on the platform 15. At the end of the spear's stroke the spring 27 in front of one of the adjustable collars 26 engages the sliding collar 25. Rapid and complete action of the reversing control link is obtained by the tension of the spring 27 which builds up between the adjustable and sliding collars until the opposing tension of the detent is overcome. The ram spear 17 now reverses it's direction of movement so drawing the arm 18 toward the ram body, the pawl 20 on the arm 18 thus pushes against the pin 21 and causing the platform 15 to rotate. The platform 15 is rotated until the reversing control 14 is triggered by the second adjustable collar 26 so completing the cycle. Thus, as the ram 10 advances and retreats the arm 18 rotates the milking platform 15 with a stop-start action.

Referring now to FIGS. 4 and 5 a second embodiment of the invention shown. In this form the radial arm 18 of the first embodiment is dispensed with. Instead of a series of pins on the underside of the platform 15 a drive ring 21' is employed. This drive ring 21' is provided with a series of projecting dogs 35 which are set around the ring 21' at suitable equidistant spacings to coincide with the number of stops required in one rotation of the platform 15.

The ram 10 is mounted on the shed floor 16 by a central mounting bracket 36 which permits the ram to pivot horizontally and vertically. The outer end of the ram spear 17 has a bearing member 37 which projects upwardly therefrom and which projects over the drive ring 21' in order that it may run thereon. The drive ring 21' thus guides the bearing member 37.

In this form of the invention a modified form of control valve 14 and switching mechanism 14' is used. The reversing control 14 is mounted on the ram body and is of the type which uses a sliding shaft 38 and an inbuilt detent to position the shaft in one or other of the two working positions. The sliding shaft 38 projects from the control 14 in the same manner as the spear 17 of the ram 10. The outer end of sliding shaft 38 is attached to a lost motion toggle 38. The bias spring of the toggle 39 is indicated generally by 40. The toggle 39 is connected to the bearing member 37 on the ram spear 17 by a linkage or draw wire 41 which is in the form of a flexible cable. The other operating portion of the switching mechanism is a push or buffer pad 42 mounted on the bearing member 37 and projecting therefrom so that when the spear 17 moves into the ram 10 the push pad 42 impinges on the outer end of the toggle lever 39' and thereby actuates the toggle 39.

In operation of this form of the invention the working fluid moves through the supply and return lines in the same way as the first embodiment. Oil entering the ram 10 forces the spear 17 out towards the end of its stroke so that the bearing member 37 moves along the drive ring 21' and over one of the projecting dogs 35. The draw wire 41 at this point tightens and throws the toggle 39 which pulls out the sliding shaft 38 so causing the control valve 14 to reverse the flow of oil. The ram 10 now reverses its direction and the spear 17 moves inwardly which causes the platform 15 to rotate due to the bearing member 37 pulling on the drive ring dog 35. As the spear moves inward the push rod 42 impinges on the toggle lever 39' which throws the toggle 39 thus pushing in the sliding shaft 38 so reversing back the oil flow. This completes one cycle and the ram now moves outwardly again. Thus as the ram 10 advances and retreats the bearing member 37 the milking platform 15 rotates with a stop start action.

In this second embodiment a small lifting ramp 43 may be fitted under the body of the ram 10. The ramp 43 is controlled externally of the platform 15 and may be used to disengage ram movement from the drive ring 21' in order to reverse the direction of the platform by hand.

Referring now to FIG. 6 a further modified form of the control valve 14 and switching mechanism 14' is shown. This control valve arrangement is really a modification of that used in the second embodiment of the invention in that the draw wire 41 and push pad 42 are utilized. The difference lies in fact that the control valve 14 does not have a detent. Projecting from each end the body of the control valve 14 is a small shaft 44. These shafts 44 operate a small slave cylinder (not shown) in the valve a body which in turn operates the flow reversing components of the valve 14. The shafts 44 lie parallel to the length of the ram 10 and the rear shaft 44, i.e. that furtherest from the outer end of the spear 17, is attached by a linkage 45 to the draw wire 41. The forward shaft 44 is designed to be pushed by the push pad. The valve 14 is operated in the same manner as the valve in the second embodiment however, the advantages lies in the fact that the slave cylinder directly operated by the shafts 44 provides a quick reverse of oil flow.

In all embodiments the oil supply lines from the control valve 14 to the ram 10 have not been shown for the sake of clarity.

The last two types of control valve 14 and associated switching mechanism 14' can be used to advantage in place of the type described in the first embodiment of the invention.

The operation of the reversing controls in the above described manner allows the ram spear to move in and out continuously through a length of stroke determined by the position of the adjustable collars in the first embodiment and the position of the push pad in the second embodiment.

The desirable ratio of 2:1, stopped time to moving time, is very simply obtained by calculating the size of ram spear necessary to provide twice as much cubic capacity of oil space in one end of the ram to that in the other end. Because of this time-cycle requirement the ram is used to pull the platform rather than push it. The power or work stroke of the ram is therefore the stroke which has the lesser available pressure.

One of the main features best described as a safety-feature of the mechanism is the relief-valve which can be so adjusted to operate just above the minimum pressure required to turn the shed. An animal can thus become caught in the entrance system and held without injury between the moving and stationary components of the shed until an operator releases the pressure by actuating the by-pass control.

Another main feature of the system is the by-pass control which can be operated by means of the pull-cord from any part of the shed. This allows an operator, who may be standing at any position around the platform, to quickly stop rotation by pulling once on the cord. A further pull on the cord will recommence rotation when required.

An advantage in using this type of drive mechanism is that it is unnecessary to have an electric motor beneath the platform. With this mechanism the hydraulic pump can be run from the same motor used to run all other shed machinery or from a motor adjacent to such motor. This makes it possible to power all functions of the shed from a stand-by unit considered essential by many farmers in isolated areas subject to frequent power cuts.

We claim:

1. A rotary cowshed comprising a horizontal platform mounted for rotation about a vertical axis, a double-acting fluid-operated ram mounted beneath the platform, the ram being set in a working relationship with a pivotally mounted arm, said arm being radially set in relation to the platform and pivoted at one end thereof, the other end of said arm having a biased pawl which engages successively with one of a series of pins spaced about the underside of the platform, fluid control lines to the ram, relief valve means and by-pass control means in the fluid control lines to the ram, and a control valve and associated switching mechanism for said ram to reverse the direction of movement of the ram.

2. A rotary cowshed as claimed in claim 1 wherein the switching mechanism comprises a sliding shaft parallel to the ram and connected to said outer end of the ram, a sliding collar on the shaft substantially midway in the length of the shaft, two adjustable collars on the shaft and separated by the sliding collar, two springs on the shaft between the adjustable collars and also separated by the sliding collar, and a linkage extending from the sliding collar to the control valve, said control valve having a detent action which is connected to and operated by said linkage.

3. A rotary cowshed as claimed in claim 1 wherein the control valve is mounted on the ram body and operated by a projecting sliding shaft, said switching mechanism comprising linkage attached to the sliding shaft and connected with the other end of the ram by a flexible cable, a push pad at said outer end of the ram, the flexible cable and the push pad operating the linkage when the ram is near an extremity of its movement.

4. A rotary cowshed as claimed in claim 3 wherein the linkage is a lost-motion toggle.

5. A rotary cowshed as claimedin claim 1 wherein the control valve is mounted on the ram body and is operated by two projecting shafts one from each end thereof, said control valve being mounted so the shafts are parallel to the length of the ram, the switching mechanism comprising a flexible cable extending from said outer end of the ram to the furthermost shaft and connected thereto by a linkage, and a push pad at said outer end of the ram and positioned to impinge on the foremost shaft, the flexible cable and the push pad operating the respective shafts when the ram nears an extremity of its movement.

6. A rotary cowshed as claimed in claim 1 wherein the ram is hydraulically operated, oil being delivered from a reservoir to the ram by a pump through a main supply line and returning to the reservoir by a main return line, both lines passing through the control valve, the relief valve means and by-pass control means being incorporated in the supply line upstream from the control valve in order that the working fluid can be diverted from the control valve and thus the ram.

7. A rotary cowshed as claimed in claim 6 wherein the by-pass control means is operated by means of a pull cord which encircles one of the inner and outer periphery of the platform.

8. A rotary cowshed comprising a horizontal platform mounted for rotation about a vertical axis, a double-acting fluid-operated ram mounted beneath the platform, the ram having a free outer end that engages successively with one of a series of dogs projecting from a drive ring attached to the underside of the platform, a bearing member mounted on said outer end of the ram and running on the drive ring and engaging successively with one of the projecting dogs, fluid control lines to the ram, relief valve means and by-pass control means, and a control valve with associated switching mechanism in the fluid control lines, the control valve being mounted on the ram body and operated by two projecting shafts one from each end thereof, said control valve being mounted so the shafts are parallel to the length of the ram, the switching mechanism comprising a flexible cable extending from said outer end of the ram to the furthermost shaft and connected thereto by a linkage, and a push pad at said outer end of the ram and positioned to impinge on the foremost shaft, the flexible cable and the push pad operating the respective shafts when the ram nears an extremity of its movement.

9. A rotary cowshed as claimed in claim 8 wherein the ram is hydraulically operated, oil being delivered from a reservoir to the ram by a pump through a main supply line and returning to the reservoir by a main return line, both lines passing through the control valve, the relief valve means and by-pass control means being incorporated in the supply line upstream from the control valve in order that the working fluid can be diverted from the control valve and thus the ram.

10. A rotary cowshed as claimed in claim 9 wherein the by-pass control means is operated by means of a pull cord which encircles one of the inner and outer periphery of the platform.

* * * * *